Oct. 11, 1949.  H. A. VAN DYKE  2,484,537
BOMBSIGHTS WITH TRAIL ANGLE SIGHTING REFLECTOR MEANS
Filed Oct. 17, 1946  2 Sheets—Sheet 1
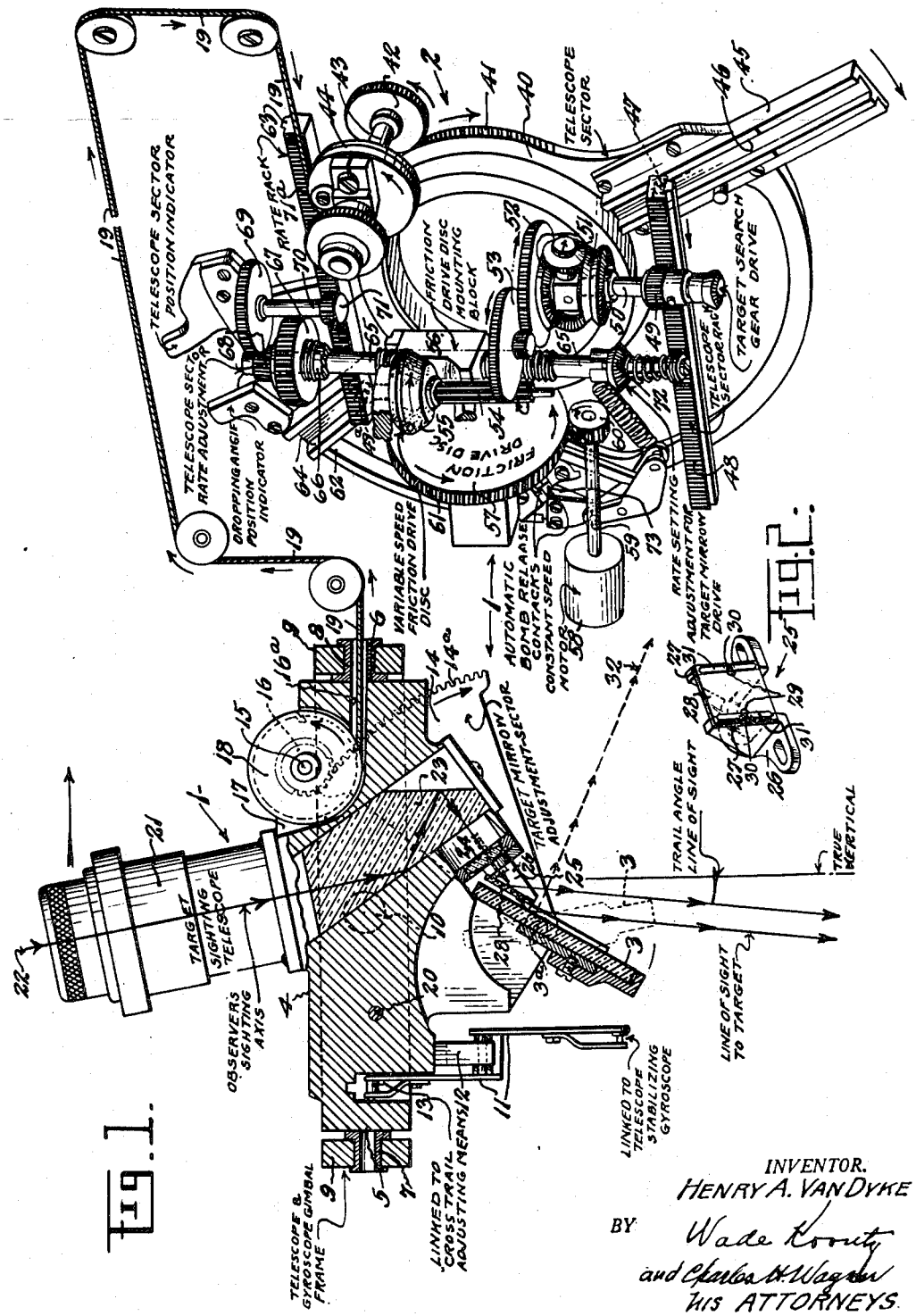
INVENTOR.
HENRY A. VAN DYKE
BY Wade Koonitz
and Charles H. Wagner
HIS ATTORNEYS.

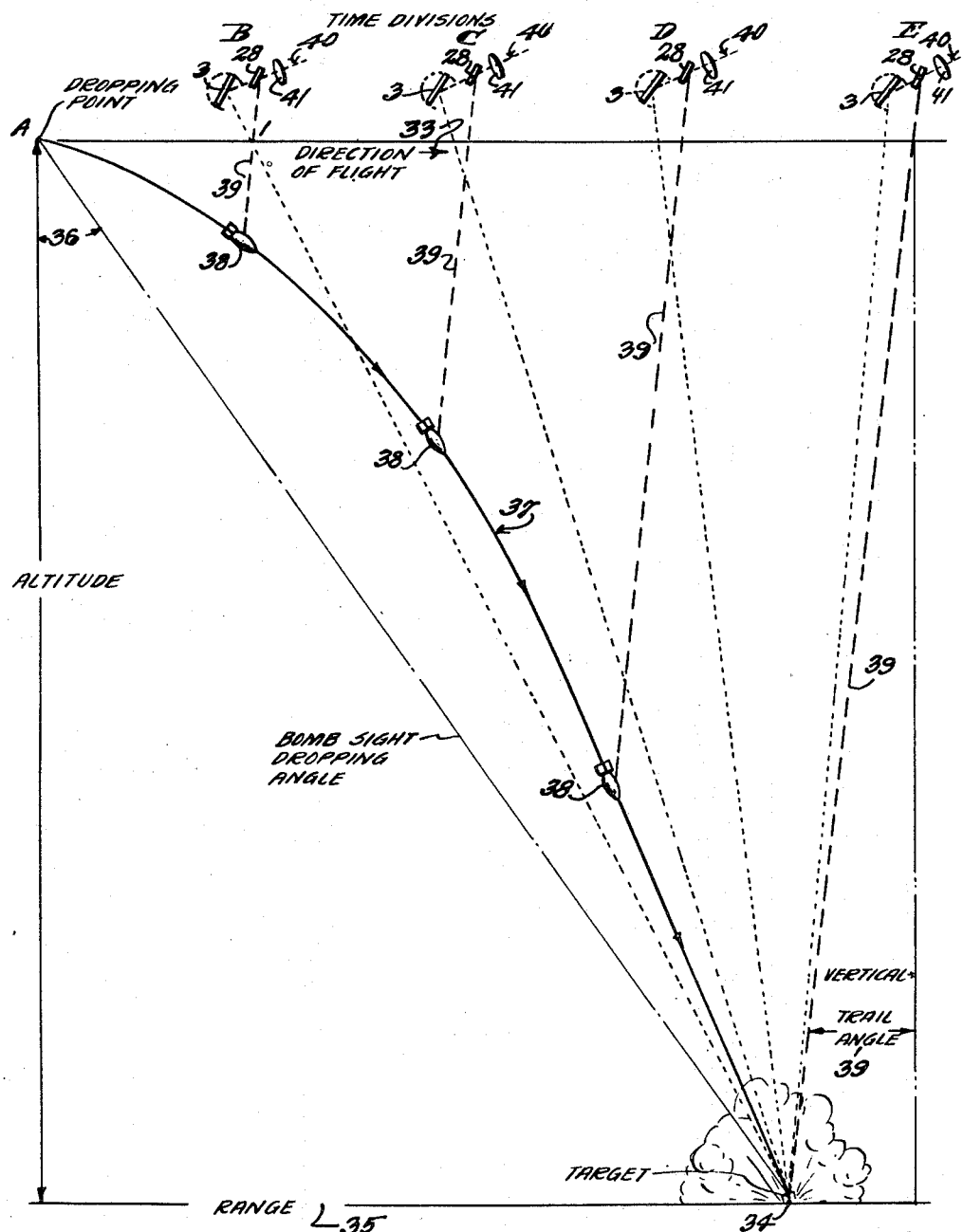

Patented Oct. 11, 1949

2,484,537

UNITED STATES PATENT OFFICE 2,484,537

BOMBSIGHT WITH TRAIL ANGLE SIGHTING REFLECTOR MEANS

Henry A. Van Dyke, Pacific Palisades, Calif., assignor to the United States of America as represented by the Secretary of War Application October 17, 1946, Serial No. 703,749

2 Claims. (Cl. 88—1)

The invention described herein may be manufactured and used by or for the Government for governmental purposes without payment to me of any royalty thereon.

This invention relates to aircraft bombsights and has for a primary objective the provision of sighting means for simultaneously observing a selected target and a bomb or missile dropped from the aircraft throughout the time of fall of the missile from a predetermined dropping point to its collision point, during a continuation of the bombing course toward and beyond the target at the same speed and altitude.

A further object of the invention is the provision of aircraft bombsighting means for simultaneously observing, at a single observation point, a selected target located below the aircraft and a superimposed collimated image of the missile released from the aircraft at a predetermined dropping angle during the approach of the aircraft toward the selected target while the missile is falling from the aircraft toward the selected target, to determine the line of fall of the missile relative to the position of the target.

A further object is the provision of a bomb or missile line of fall observing attachment for aircraft bombsights comprising means for producing collimated images of a selected target and a bomb or missile released from the aircraft during the fall of the missile to the target while the aircraft is travelling toward and across the target at a uniform speed and elevation, so as to observe the line of fall of the missile with respect to the position of the target through the sighting objective of the bombsight in order to determine any deviation of the missile relative to the target or error in the predicted range due to target acceleration, ballistic winds, errors in the dropping point, etc., the attachment comprising means for aiding the bombardier in accurately guiding remotely controlled directable bombs or missiles during their fall in order to assure that they will hit a selected target, assuming that the aircraft is maintained substantially on course in the same direction and at the same speed and altitude as it was during the bombing run and until the bomb or missile substantially completes its fall.

A further object of the invention is the provision of means for superimposing a reflected image of a bomb, which has been dropped from a bombing aircraft at a predetermined dropping angle to hit a selected target, on a reflected image of the selected target in the target sighting objective of a conventional aircraft bombsight by splitting the sighting field of the bombsight telescope into two sighting components, both of which being finally collimated in the bombardier's or observer's single sighting axis, one of the sighting components being a line of sight directly to the target from a conventional tiltably adjustable bombsight mirror and the other sighting component being a line of sight fixed with respect to the bombsight telescope and disposed along a predicted trail angle or line of fall of the type of bomb to be dropped and reflected into collimation with the first line of sight between the observer's telescope objective lens and the tiltable bombsight target mirror so that when the two component lines of sight to the target and to the bomb are collimated and coincident in the observer's objective at substantially the end of the predicted time of fall of the bomb, the bombardier will be assured that the bomb will hit the target, means being provided to tilt the target mirror at a predetermined rate which is necessary to progressively adjust the component line of sight to "track" the target and cause the same to intersect the trail angle line of sight at the target at the end of the predicted time of fall, the novel arrangement being in the form of a substantially transparent reflecting mirror fixed on the bombsight at a predetermined angle to reflect the secondary component line of sight along the aforementioned trail angle into the bombsight objective in coincident relation with the aforementioned line of sight to the target, so that when a bomb or missile is dropped from a bomber and falling along its predicted trail angle, its image will be reflected through the sighting objective of the bombsight telescope in exact coincidence with the reflected target image and the bomb or missile will strike the target.

Radiant energy directed bombs or falling missiles, such as the conventional "Razon" type of radio controlled missiles, when dropped, follow a trajectory approximately equal to that of a conventional known aircraft bomb, and by employing my improved bombsight, corrections in the range and azimuth positions of the bomb relative to the target may be made at any time throughout the fall of this type of bomb to bring the reflected image of the bomb into coincidence with the reflected image of the target, assuring that the bomb will strike the target.

Other objects and advantages of the invention will become apparent in the following description taken in connection with the accompanying drawings in which like reference characters refer to like parts in the several figures.

Fig. 1 is a somewhat diagrammatic view illustrating a portion of a conventional bombsight including the telescope target sighting unit, parts being broken away and shown in section and illustrating my invention as applied thereto, the right hand portion of the figure illustrating a conventional computer operating means for variably tilting the telescope target mirror at predetermined rates and determining the predicted dropping angle or range for the release of the bomb or bombs;

Fig. 2 is a detailed perspective view of my improved bombsight attachment showing the same detached from the bombsight; and Fig. 3 is a diagrammatic view illustrating a number of successive positions of the bombsight relative to a selected target during a flight across the target from a predicted dropping point for a bomb to its collision point at the termination of its predicted time of fall.

Referring to Fig. 1 of the drawings, illustrating somewhat diagrammatically a portion of a conventional and well known type of bombsight, such as the "Norden" sight, the numeral 1 indicates generally the target sighting telescope unit while the computing unit for determining the sighting and dropping angle for the release of the bomb, and for progressively tilting the target mirror to "track" the target to maintain the reflected target image in the sighting objective of the bombardier's telescope is indicated generally at 2.

The telescope unit 2 includes a target image reflecting tiltable mirror 3 trunnioned in spaced brackets depending from a balanced cradle 4, the cradle being trunnioned at opposite ends 5 and 6 on hollow trunnions 7 and 8, carried by a gyroscope Cardan or gimbal frame 9. The gimbal frame 9 is in turn trunnioned at its opposite ends in the bombsight casing, not shown, to tilt about the horizontal axis 10 as shown in the drawings. A lever 11 of the first class is pivoted on a bracket 12 depending from the cradle, the upper end 13 of the lever being adapted for connection to a "cross trail" adjusting mechanism, not shown, carried on the bombsight casing. The lower end of the lever 11 is adapted to be connected to an offset actuating arm portion of the bombsight stabilizing gyroscope, not shown, that is carried by the Cardan 9.

The bombsight stabilizing gyroscope forms no part of my invention but is simply employed for the purpose of maintaining the telescope unit in fore and aft and laterally stabilized position in space at all times. Fore and aft tilt of the bombsight case permits the Cardan 9 to remain level, while during lateral relative tilt of the casing, the gyroscope unit remains level and through a link connection, not shown, which is attached to the lower end of the lever 11 causes the telescope unit to be maintained vertical, except for any previously calculated "cross trail" or lateral adjustment of the upper end of the lever 11 which would cause the telescope to be stabilized by the gyroscope in a laterally tilting position when "cross trail" sighting calculations are made.

The target mirror trunnion member 3a projects through a supporting bracket on the cradle and has a target mirror adjusting sector 14 fixed thereon, formed with a rack 14a meshing with a pinion 16 fixed on a shaft 15 that is rotatably journalled in the cradle body 4.

The cradle 4 is formed with a cable accommodating passage 16a extending in axial alignment with an axial passage through the trunnion 8 and terminates in a circular recess 17 in which is disposed a cable drum 18 fixed on the end of the shaft 15. A cable 19 is secured at one end to the ground and wrapped around the periphery with the other end of the cable extending axially through the axial passage 16a in the trunnion 8, the end of the cable being connected for actuation, to the computing mechanism unit 2.

Spring means, not shown, is provided for resiliently tensioning the gear sector 14 in a counterclockwise direction as seen in Fig. 1, to maintain the cable 19 under uniform tension and rotate the sector 14 and the target mirror 3 counterclockwise when the cable is slacked. This cable tensioning means is conventional and not important to the invention but it comprises a shaft 20 (Fig. 1) having a cable drum, not shown, fixed on one end thereof with a cable dead ended thereon and wrapped clockwise around the drum with its free end secured to the outer portion of the target mirror adjusting sector 14. The shaft 20 is freely journalled in the cradle 4 and extends through and beyond the side thereof and has a coil or clock spring, not shown, secured at one end to the shaft and at its other end to the side of the cradle, tensioning the shaft 20 for rotation in an anticlockwise direction.

The optical system of the telescope unit 1 comprises a sighting telescope 21, rigidly mounted on the cradle in slightly inclined relation, having the usual objective lens and cross hair reticule system, the line of sight through the telescope from the bombardier's position being indicated at 22. A compound prism 23 is mounted in a suitable recess in the cradle, for reflecting the line of sight from the observers' position 22 through a lens 24 to the target mirror 3.

My improved arrangement includes a trail angle reflecting mirror attachment indicated generally at 25, comprising a rigid frame 26, best seen in Fig. 2, having spaced inclined supporting surfaces 27 upon which is mounted a thin semi-transparent mirror or reflector member 28, notched at its opposite edges to receive securing screws 30. Each of the securing screws carries a resilient leaf or spring member 31 apertured intermediate its ends to receive the screws 30, the opposite ends of the springs being tensioned against the surface of the mirror 28, holding the same securely against the inclined supporting surfaces 27 of the frame 26.

The inclination of the reflector 28 is predetermined or preadjusted for the predicted trail angle or line of fall of the particular type of bomb or missile that is to be dropped, so that if that particular type of bomb is released and the aircraft continues on its former course, the bomb or any object falling along the predicted trail angle will be reflected by the reflecting surface 28 into the compound prism 23 in coincident or collimated relation with the line of sight from the target mirror 3.

When the target mirror is tilted in the usual manner to cause the line of sight to "track" the selected target during the entire predicted time of fall of the missile, when the missile is dropped at the proper dropping angle or range, the line of sight along the trail angle to the missile and from the target mirror to the target at the end of the time of fall will be substantially identical, assuming of course that the aircraft carrying the sight continues on the same course beyond the bombing run at the same speed, direction and elevation.

The dotted line position of the target mirror 3 in Fig. 1 indicates any preliminary or initial target sighting angle 32 before the critical dropping angle is reached during the approach of a bomber carrying the sight toward a selected target while the full line position of the target mirror in this particular illustration indicates the final tilted position of the target mirror at the end of the predicted time of fall when the line of sight from the target and from the bomb are parallel and substantially coincident between the mirror 3 and the target and between the mirror 28 and the missile that was dropped and falling on its predicted trail angle. With the target mirror in the dotted line position as seen in Fig. 1, as the bomber continues its bombing run, the bombardier adjusts the computing mechanism to cause the cable 19 to be withdrawn from the cable drum 18 at the rate to rotate the sector 14 to maintain the reflected line of sight 32 on the target. At a predetermined instant, as the bomber advances toward the target, during the tilting of the mirror, the computer mechanism 2 which has been adjusted to determine the proper dropping angle of the line of sight to the target for the particular speed, elevation, type of bomb, etc., releases the bomb when the sighting angle 32 equals the predicted dropping angle (36 in Fig. 3). The image of the bomb, falling along the trail angle 39 in Fig. 3, and the image of the target can be simultaneously observed by the bombardier through the telescope objective 21 in superimposed relation to each other and any departure or deviation of the missile or bomb relative to the target can readily be observed. If the missile is of the remotely controlled directable type, it can be guided back into coincident relation with the target by observing the positions of the two images in the sighting objective and manipulating the conventional radio controls for the bomb.

Before briefly describing the computing mechanism for moving the cable 19, reference is made to Fig. 3, in which the arrow 33 indicates the direction of flight of a bomber carrying my improved bombsight and the positions A, B, C, D and E represent the positions of the bomber and bombsight at equal time divisions along the course of the bomber throughout the predicted time of fall of a missile dropped at A and falling toward a target 34 at a predicted range 35 for the speed and altitude at which the aircraft is moving. The critical sighting or bomb dropping angle is indicated at 36 and the trajectory of the bomb throughout its fall is indicated at 37. Since the bomb 38 is disclosed as falling along the predicted trail angle 39 at the positions B, C, D and E, the image of the missile 38 is reflected by the fixed trail angle reflector 28 through the objective lens system 41 into the bombardier's vision in the sighting axis 10, in coincident relation with the primary line of sight to the target 34, reflected into the bombardier's vision by the tiltable target mirror 3. The direction of fall of the missile with respect to the position of the target can be observed at all times throughout the entire fall and any deviation of the position of the bomb and its image from a coincident relation to the target and the sighting axis relative to the target can be immediately observed and the accuracy of the bombing is determined up to the instant when the missile completes its fall. The computing mechanism, part of which is somewhat diagrammatically depicted in the right hand portion of Fig. 2, comprises a target mirror tilting or telescope sector 40 suitably journalled for rotation in the bombsight case, not shown. A gear portion 41 formed on the sector 40 meshes with a pinion 42 that is fixed on a shaft 43, journalled in the casing. The shaft 43 has a cable drum 44 fixed thereon around which the target mirror tilting cable 19 is wrapped and to which the end of the cable is secured. Swinging movements of the telescope sector 40 rotates the cable drum 44 winding up or playing out the cable 19 to correspondingly tilt the target mirror. The telescope sector 40 is provided with a radially extending arm 45 having a guide channel 46, receiving a pin 47 that projects from one side of the telescope mirror actuated rack 48. A gear 49 is carried by a vertical shaft 50 and driven through a differential gear drive 51 by a gear train including the gears 52, 53 and 54, the gear 54 being secured to a friction drive disc 55 that is carried in a vertically adjustable carrier member 56. The periphery of the disc 55 is disposed in frictional driving engagement with a friction face of a friction driving disc 57 driven at a constant speed by a constant speed motor 58 through a pinion 60 fixed on a motor shaft 59 and meshing with teeth 61 formed on the periphery of the friction driving disc.

A rate or dropping angle determining sector 62 is concentrically journalled in the bombsight case beside the telescope sector 40 and is rotatably adjustable to determine the rate of tilt of the telescope target mirror 3 and the dropping angle 36 of the line of sight to the target, for the missile with respect to a downwardly extending vertical from the aircraft, at which a bomb should be released in order to strike a selected target such as 34 in Fig. 3. A rate rack 63, similar to the rack 49, is disposed for longitudinal adjustment and is provided with a pin 49a projecting from one end thereof into guiding relation with a radial guide channel 64 formed in a radial arm on the rate sector 62. The friction disc carrying member 56 for the disc 55 is threaded to receive a vertically disposed adjusting screw or shaft 65 axially and rotatably journalled in a sleeve 66, the sleeve 66 being in turn threaded into a spindle lifting nut 67. The shaft 65 has a pinion 68 fixed on its upper end, meshing with a gear 69 fixed on a shaft 70 carrying a relatively fixed pinion 71 at its lower end which meshes with gear teeth 71a on the rate rack 63. Rotative adjustment of the shaft 65 adjusts the vertical position of the friction disc 55 relative to the center of the friction drive disc 57 and is accomplished by a manually adjustable shaft, not shown, having a bevel gear, not shown, which meshes with a bevel gear 72 on the lower end of the vertical shaft 56.

In other words, manual rotative adjustment of the bevel pinion 72 makes two adjustments. First, it sets the rate sector 62 and sets the position of the bomb dropping control contacts 73 with respect to a contact release notch, not shown, in the telescope sector 40 for operating these contacts when the telescope sector 40 is rotated to a predetermined position relative to the rate sector 62 so that the sighting angle of the telescope target mirror 63, as determined by the position of the telescope sector, equals the bomb dropping angle as determined by the adjusted position of the rate sector 62. Second, the rotative adjustment of the shaft 65 raises or lowers the carriage 56, adjusting the position of the friction drive disc 55 relative to the center of the constant speed friction drive disc 57 and determines the rate at which the telescope sector 40 is moved, determining the rate at which the cable 19 is withdrawn from the cable drum 18 and as a result determines the rate of tilt of the target mirror 3. As before mentioned, this computing mechanism 2 is well known and employed in the "Norden" bombsight and no claim is made for the detail structure therein. The primary purpose in describing it briefly is to set forth means for operating the target mirror at a predetermined rate to determine the dropping angle and to maintain the line of sight on the target throughout the entire predicted time of fall of the missile. Obviously other types of target mirror actuating mechanisms may be employed without departing from the spirit of the invention as defined by the appended claims.

Applicant's invention is the combination of the supplemental fixed reflector 28 with the target sighting means disposed between the target mirror 3 and the telescope lens system 24 and prism 23 to reflect the line of sight along a predetermined trail angle into the sighting objective 21 in coincident registration with the cross hairs therein, arranged so that the line of sight from the target mirror to the observer will pass through the fixed trail angle reflector and into the telescope sighting objective 21 in collimated coincident relation with the line of sight along the trail angle.

When remotely controlled directable missiles are dropped, these usually employ a bright flare in their tails so that they can be observed throughout the greater portion of their fall. It is within the purview of the invention to so color or increase the density of the trail angle reflector or mirror 28 as desired to regulate the relative degree of illumination from the target line of sight to the degree of illumination from the flare on the bomb.

Briefly describing the operation, the computing mechanism 2 is adjusted by a manual manipulation of the bevel gear 72 during the flight of the bomber carrying the sight toward a selected target to be bombed so that the target mirror 3 is progressively tilted to maintain the reflected target image on the cross hairs, not shown, in the sighting objective 21. The adjustment of the rate sector 62 positions the bomb release contacts 73 therein in a position to release the bomb when the bomb release notch in the telescope sector 40 registers with the bomb release contacts 73 and simultaneously when the line of sight to the target with respect to the vertical equals the predicted dropping angle.

As the bomb is released, it should fall along its predicted trail angle with respect to a vertical line from the aircraft and its image will be reflected through the bombsight optical system by the fixed trail angle reflector 28 and the position of the bomb relative to the target can be observed at all times during its fall.

The telescope sector 40 is driven at any predetermined rate by the position of the friction drive disc 55 on the driving disc 57 and rotates the drum 44 to withdraw the cable 19 to progressively tilt the target mirror so as to reflect the image of the approaching target through the fixed mirror 28 into the bombsight objective lens system in coincident relation to the image of the bomb.

It is not important that the bomb and target images are held accurately on the cross hairs of the bombsight objective lens after the bomb has been dropped, so long as the image of the bomb (or flare) is held in accurate registration with the target image, assuming of course that the missile is a remotely controlled type and its course can be changed to bring it back, during its fall, into exact registration with the target image in the event that it becomes displaced because if the bomb image is maintained on the target image up to the end of the predicted time of fall of the bomb, the bomb must hit the target.

If the two bomb and target images move out of the sighting objective, due to a slight change in direction or attitude of the aircraft, the telescope stabilizing gyroscope may be precessed to again bring the target image into view and the position of the bomb image relative thereto may be noted for determining the direction of fall of the bomb relative to the target.

The construction of the type of bombsight and computer being conventional, its disclosure is for exemplary purposes and it is obvious that various changes may be made in the specific apparatus and structure as disclosed in the drawings and described in the specification without departing from the spirit of the invention as defined by the accompanying claims.

I claim:

1. In a bombsight, a support, a target sighting objective lens fixed on the support, a target image reflector tiltably arranged on the support in the sighting field of the sighting objective lens, adjustable power means on the bombsight connected to the target image reflector to progressively tilt the reflector during movement of the bombsight toward a selected target to maintain a line of sight through the objective lens to the target, reflected by the tiltable reflector, during approach movement of the bombsight toward the target at a uniform speed and altitude when the bombsight is mounted on an aircraft approaching the target at uniform speed and altitude, a semi-transparent trail angle reflecting mirror fixedly arranged on the support between the sighting objective lens and the tiltable target image reflector to reflect the image of a missile, dropped from the aircraft and falling free below the bombsight, into the target sighting objective lens in coincident sighting relation with the reflected target image during the aforesaid movement of the bombsight toward the target.

2. A trail angle sighting attachment, for a bombsight having a stabilized support, a target sighting telescope fixedly arranged on the support having a target sighting axis, a target image reflecting mirror tiltably arranged on the support across the telescope target sighting axis to reflect the image of a selected target into the telescope, means for tilting the mirror while the bombsight is moving toward the selected target at a substantially uniform speed and altitude; said attachment comprising a semi-transparent mirror and rigid mounting means therefor arranged to fixedly mount the semi-transparent mirror in a predetermined inclined plane across the telescope target sighting axis between the telescope and the tiltable mirror at such an angle to the said sighting axis as to reflect the image of a missile falling freely below the bombsight, into the telescope independently of the reflected target image from the tiltable target image reflecting mirror, whereby the reflected image of the target and the reflected image of the missile are simultaneously reflected through the telescope while an aircraft carrying the bombsight is advancing toward the target at the aforesaid uniform speed and altitude and the missile is dropped from the aircraft at a predetermined dropping point during the movement aforesaid of the aircraft toward the target.

HENRY A. VAN DYKE.

REFERENCES CITED

The following references are of record in the file of this patent:

UNITED STATES PATENTS

| Number | Name | Date |
|---|---|---|
| 858,297 | Latimer | June 25, 1907 |
| 1,114,705 | Boykow | Oct. 20, 1914 |
| 1,432,360 | Rouge | Oct. 17, 1922 |
| 2,162,698 | Chafee | June 20, 1939 |